United States Patent [19]

Brandin

[11] Patent Number: 5,801,823
[45] Date of Patent: Sep. 1, 1998

[54] DRIVER'S EYES LOCATION DETERMINING APPARATUS AND METHOD

[76] Inventor: Börje A. Brandin, Route du Port 12A, 1009 Pully, Switzerland

[21] Appl. No.: 806,023

[22] Filed: Feb. 21, 1997

[51] Int. Cl.⁶ .......................... G01B 11/26; G01N 21/00; G05B 1/06; G02B 5/08
[52] U.S. Cl. .......................... 356/139.03; 250/559.3; 250/559.37; 318/640; 359/843
[58] Field of Search .......................... 250/559.3, 559.37; 356/139.03; 359/843; 318/640

[56] References Cited

U.S. PATENT DOCUMENTS

| | | | |
|---|---|---|---|
| 3,864,030 | 2/1975 | Cornsweet | 356/139.03 |
| 4,956,794 | 9/1990 | Zeevi et al. | 364/559 |
| 5,064,274 | 11/1991 | Alten | 359/604 |
| 5,085,507 | 2/1992 | Williams et al. | 356/139.03 |
| 5,096,281 | 3/1992 | Windebank et al. | 359/868 |
| 5,684,647 | 11/1997 | Rouleau | 359/843 |

FOREIGN PATENT DOCUMENTS

0287993  10/1988  European Pat. Off. .
PCT/IB95/
01115  11/1995  WIPO .

*Primary Examiner*—Stephen C. Buczinski
*Attorney, Agent, or Firm*—Rockey, Milnamow & Katz, Ltd.

[57] ABSTRACT

Apparatus for determining the location of the eyes of a driver for a vehicle having a central inside rearview mirror, comprises a distance sensor, an orientation detector, a signal processor. The distance sensor senses the distance between the central mirror and the driver's head. The orientation detector detects the orientation of the inside mirror. Once the driver has manually adjusted the inside mirror, the driver operates a switch, which activates both the distance sensor and the orientation detector. The signal processor, preferably a microcomputer, uses the equation of a parabola in space to determine the location of the parabola's focus, and thereby determine the location of the driver's eyes.

17 Claims, 5 Drawing Sheets

DRIVER'S EYES LOCATION DETERMINING APPARATUS AND METHOD

FIELD OF THE INVENTION

This invention relates to the mechanisms and methods for determining the location of the eyes of a motor-vehicle driver.

BACKGROUND OF THE INVENTION

Motor vehicles have rearview mirrors. For comfort and safety reasons it is important to ensure that the rearview mirrors are oriented correctly. The correct mirror orientation depends upon the position of the driver's eyes, and therefore upon the driver's body proportions and sitting habits.

There is accordingly a need for a mechanism which automates the determination of the location of driver's eyes. Such a mechanism is particularly useful in systems for automatically adjusting remote rearview mirrors of vehicles being shared by drivers with different body proportions.

SUMMARY OF THE INVENTION

The subject invention is directed towards apparatus and methods for determining the location of the eyes of a driver of a vehicle having a directly adjustable proximate rearview mirror. The apparatus comprises distance sensing means for sensing the distance between the proximate mirror and the driver's head and generating distance signals correlatable therewith, orientation detecting means for detecting the orientation of the proximate mirror after adjustment by the driver to achieve a desired rearview sightline, and generating orientation signals correlatable therewith, and signal processing means coupled to the distance sensing means and the orientation detecting means for processing the distance signals and the orientation signals and for generating output signals indicative of a current location for the driver's eyes based upon an equation for a parabola having a focus located at the driver's eyes.

The signal processing means preferably comprises means for determining an equation for the parabola having a focus located at the driver's eyes and an axis parallel to a rearview vector representing a desired rearview sightline, and falling in a plane formed by the rearview vector, the plane being perpendicular to the central mirror, and containing the center point of the mirror, and means for determining the location of the focus of the said parabola.

The signal processing means preferably models the driver's head as a rectangular parallelepiped having a front side corresponding to the driver's face, and the driver's eyes are modelled as a point on the front side midway between the eyes on the driver's face.

The proximate mirror is typically the central inside mirror. The distance sensing means is preferably an infrared or ultrasound sensor mounted on the central mirror mount. The apparatus preferably includes a driver operable switch which activates both the distance sensor and the orientation detecting means. The signal processing means is preferably a microcomputer programmed to determine the location of the driver's eye.

The present invention is also directed to apparatus for determining the location of the eyes of a driver of a vehicle having a directly adjustable proximate mirror having a known center point, comprising storage means for storing a center point signal indicative of the known center point of the proximate mirror, and a longitudinal plane signal indicative of a longitudinal vertical plane extending through the middle of the driver's seat at a known lateral distance from the center point of the mirror; orientation detecting means for detecting the orientation of the proximate mirror after adjustment by the driver to achieve a desired reflected sightline, and generating orientation signals correlatable therewith; and processing means operatively coupled to the orientation detecting means and the storage means, for processing the center point signal, the longitudinal plane signal, and the orientation signals, and for generating a processed signal indicative of a current location of the eyes of the driver, based upon an equation for a parabola having a focus point located at the driver's eyes.

BRIEF DESCRIPTION OF THE DRAWINGS

The invention will now be described, with reference to the following drawings, in which.

DETAILED DESCRIPTION OF THE PREFERRED EMBODIMENT

Figure 1:
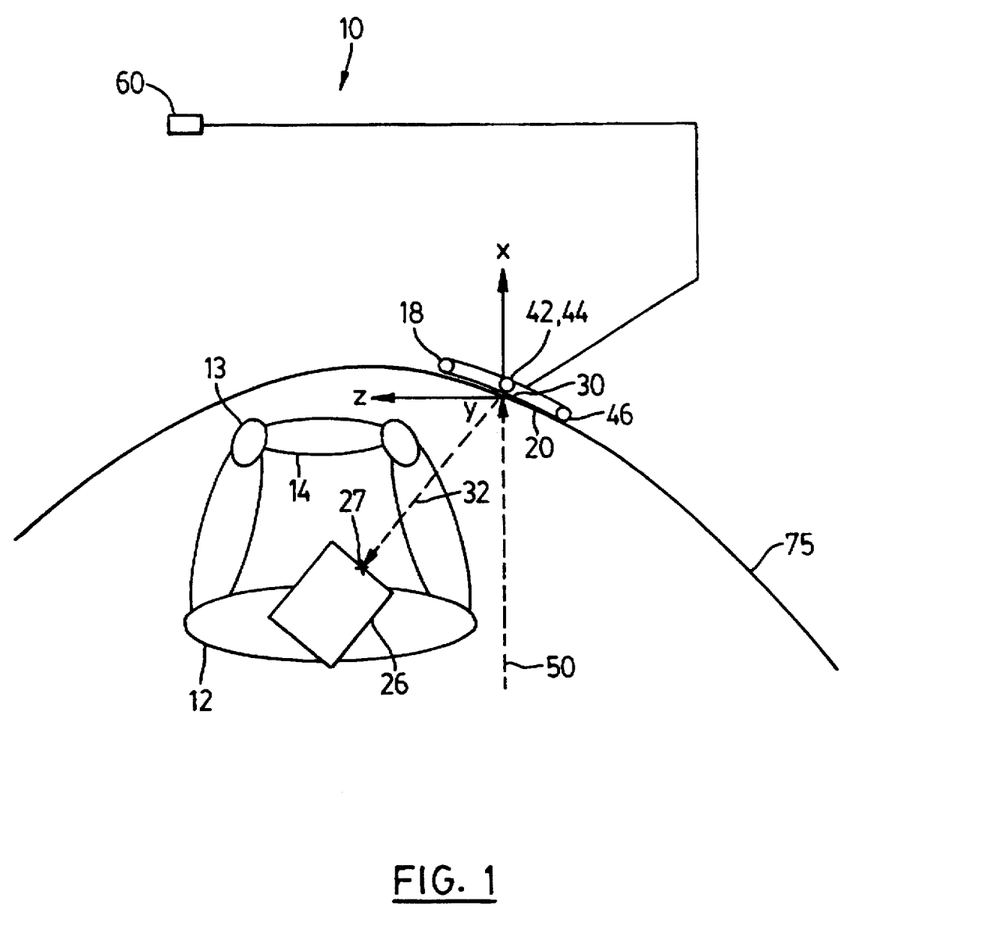
FIG. 1 is a schematic top plan view of apparatus made in accordance with a preferred embodiment of the subject invention.

FIG. 1 illustrates a preferred embodiment of the subject invention generally shown as 10. Driver 12 is shown positioned in a driving position behind steering wheel 14. Central inside mirror 20 is assumed to be mounted on the vehicle in a central mirror mount 18. Apparatus 10 comprises a distance sensor 42, an orientation sensor 44, a switch 46, and a signal processor 60.

In the coordinate system shown in FIG. 1, the origin of the coordinate system is at the center point 30 of central mirror 20, the X axis points forward along the longitudinal axis of vehicle 10, the Y axis is vertical, pointing up, and the Z axis points transversely to the left. Vector 32 is the vector between the center point 30 of central mirror 20 and the driver's eyes center point 27.

Distance sensor 42, typically an infrared or ultrasound or other suitable sensor, is located on the mirror mount 18 of central mirror 20. Distance sensor 42 determines the distance between the central mirror 20 and the driver's eyes center point 27. Central mirror orientation detector 44 is located on mirror mount 18, and detects the orientation of central mirror 20 after it has been manually adjusted by driver 12. Orientation detector 44 may comprise a two degree of freedom electromechanical rotational-position sensing device able to detect the rotation of the central mirror 20 in the Y axis and in a rotational axis orthogonal thereto. Switch 46 located on mirror mount 18 activates distance sensor 42, and orientation detector 44.

Signal processor 60 models the driver's head 26 as a rectangular parallelepiped of known dimensions, of which one side corresponds to the driver's face, and rotatable and tiltable about the driver's body. The driver's eyes are modelled as two points of known position on the driver's face, and the driver's eyes center point 27 is modelled as the point midpoint between the eyes on the driver's face. Without loss of generality, the driver's eyes center point will be used in the following to model the driver's eyes, but each of the driver's eyes could be used instead.

It is assumed that the driver will set central mirror 20 so that light ray 50 is reflected in the direction of the driver's eyes center point 27 after hitting the center point 30 of mirror 20. In general, light ray 50 is an horizontal ray of light parallel to the longitudinal axis of the vehicle. However, these light rays could be rays from other directions necessary to achieve a desired field of view for rearview vision purposes. Typically the optimum direction of light ray 50 would be determined by the vehicle's manufacturer for each particular vehicle.

Figure 2:
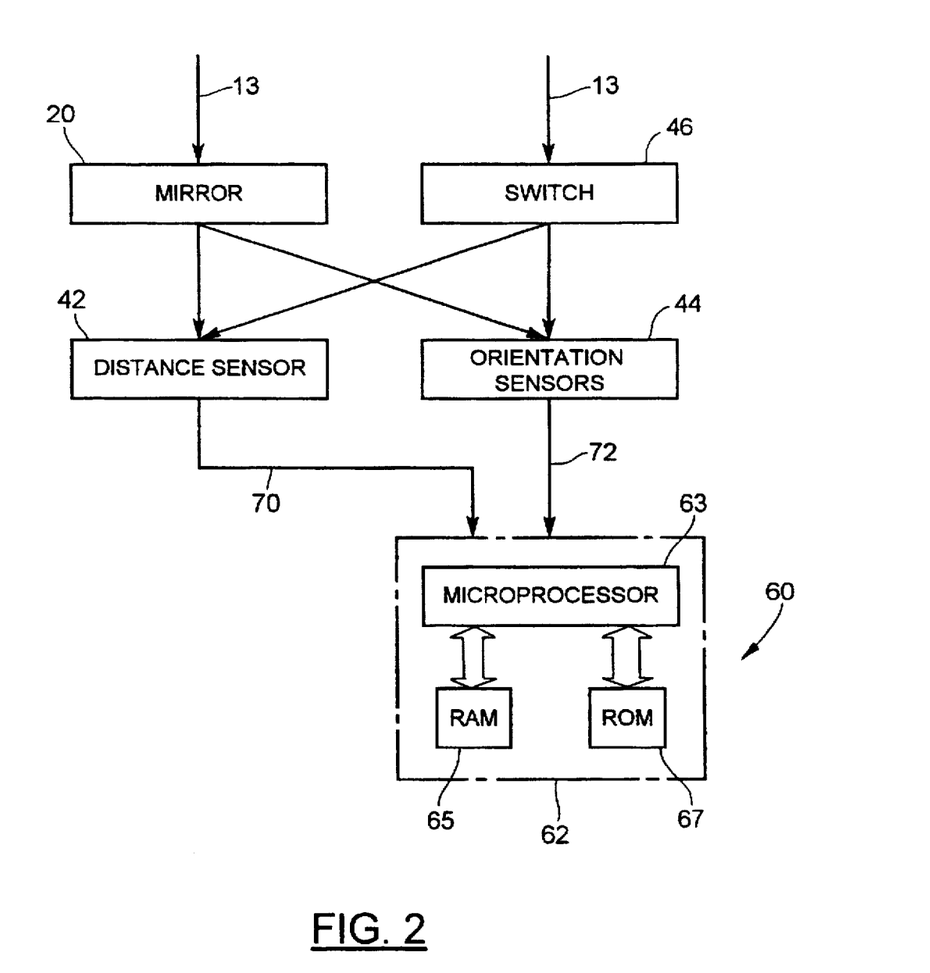
FIG. 2 is a diagram illustrating the geometry utilized by the signal processing means of the preferred embodiment.

Referring now to FIG. 2, signal processor 60 preferably comprises microcomputer 62 located at a convenient location in the vehicle, electrically coupled to the other components of the subject apparatus by cables or other electrical connections. Microcomputer 62 includes a microprocessor 63 having RAM memory 65 and ROM memory 67, in which is stored the coordinates of the center point 30 of mirror 20, as determined from vehicle dimensions and mirror location. Similarly, light ray vector 50 is stored in the ROM memory 67. Microcomputer 62 receives distance signal 70 from distance sensor 42, orientation signal 72 from central mirror orientation detector 44. Microprocessor 63 processes these signals in a manner hereinafter described, and generates the location of the driver's eyes center point 27.

Figure 3:
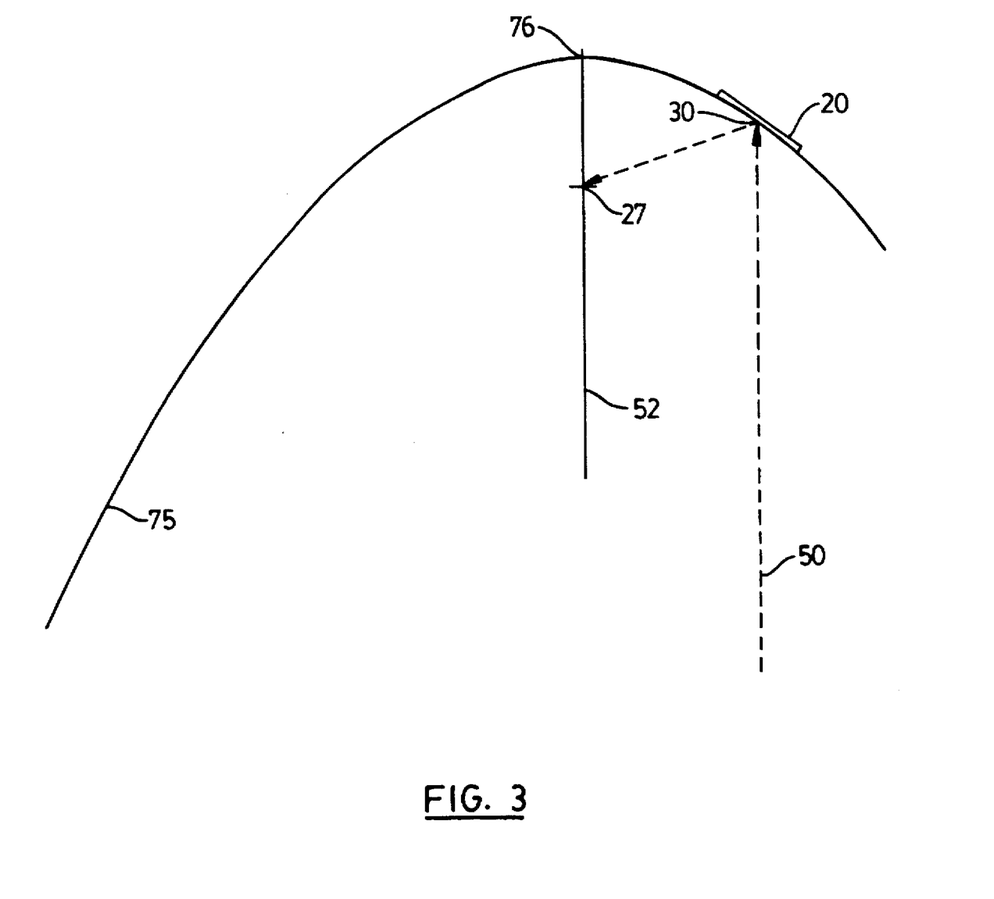
FIG. 3 is a block diagram of the components of the preferred embodiment.

Referring now to FIG. 3, signal processor 60 utilizes the equation of a parabola to determine the current location of the driver's eyes. From the definition of a parabola 75, it is known that a light ray 50 travelling in the parabola's plane, parallel to the parabola's axis 52, towards the parabola's focus 27 and vertex 76 (i.e. towards the concave side of the parabola), would be reflected towards the parabola's focus 27, if the parabola 75 were a mirror or light-reflecting. By (a) placing a mirror 20 perpendicular to the parabola's plane and tangent to the parabola 75 in the point 30 where the light ray 50 meets the parabola and (b) by placing the driver's eyes at the parabola's focus 27, light ray 52 would be reflected towards the parabola's focus 27, that is towards the driver's eyes.

The above considerations are sufficient to determine the location of the driver's eyes 27 once the driver has adjusted mirror 20 so that light ray 50 is reflected in the direction of the driver's eyes center point 27 after hitting the center point 30 of mirror 20.

It should be noted that an elliptic (circular) paraboloid of axis unit vector 52, of focus the driver's head 27 and containing mirror center point 30 on its surface, could be used instead of the above mentioned parabola. Mirror 20 would then have to be oriented so as to be tangent in center point 30 to the paraboloid's surface.

The parabola of focus located at driver's eyes center point 27, of axis parallel to unit vector 50, and inhabiting the plane orthogonal to mirror 20 in center point 30 and containing mirror center point 30 and unit vector 50, is uniquely defined by the following data: (a) knowing that the parabola inhabits the plane orthogonal to mirror 20 in center point 30 and containing mirror center point 30 and unit vector 50; (b) knowing that the parabola's axis is parallel to unit vector 50; (c) knowing that vector 50 is directed towards the concave side of the parabola; (d) by knowing that mirror center point 30 lies on the parabola, and (e) by knowing the distance from mirror center point 30 to the driver's eyes center point 27, i.e. the length of vector 32.

In other words, data (a) to (e) above are sufficient to uniquely parametrize the equation of a parabola in space, in order to obtain the equation of the parabola mentioned above. Consequently, having obtained the equation of the above mentioned parabola allows to determine the location of the parabola's focus using well known relationships relating the equation of a parabola and the location of its focus.

Figure 4:
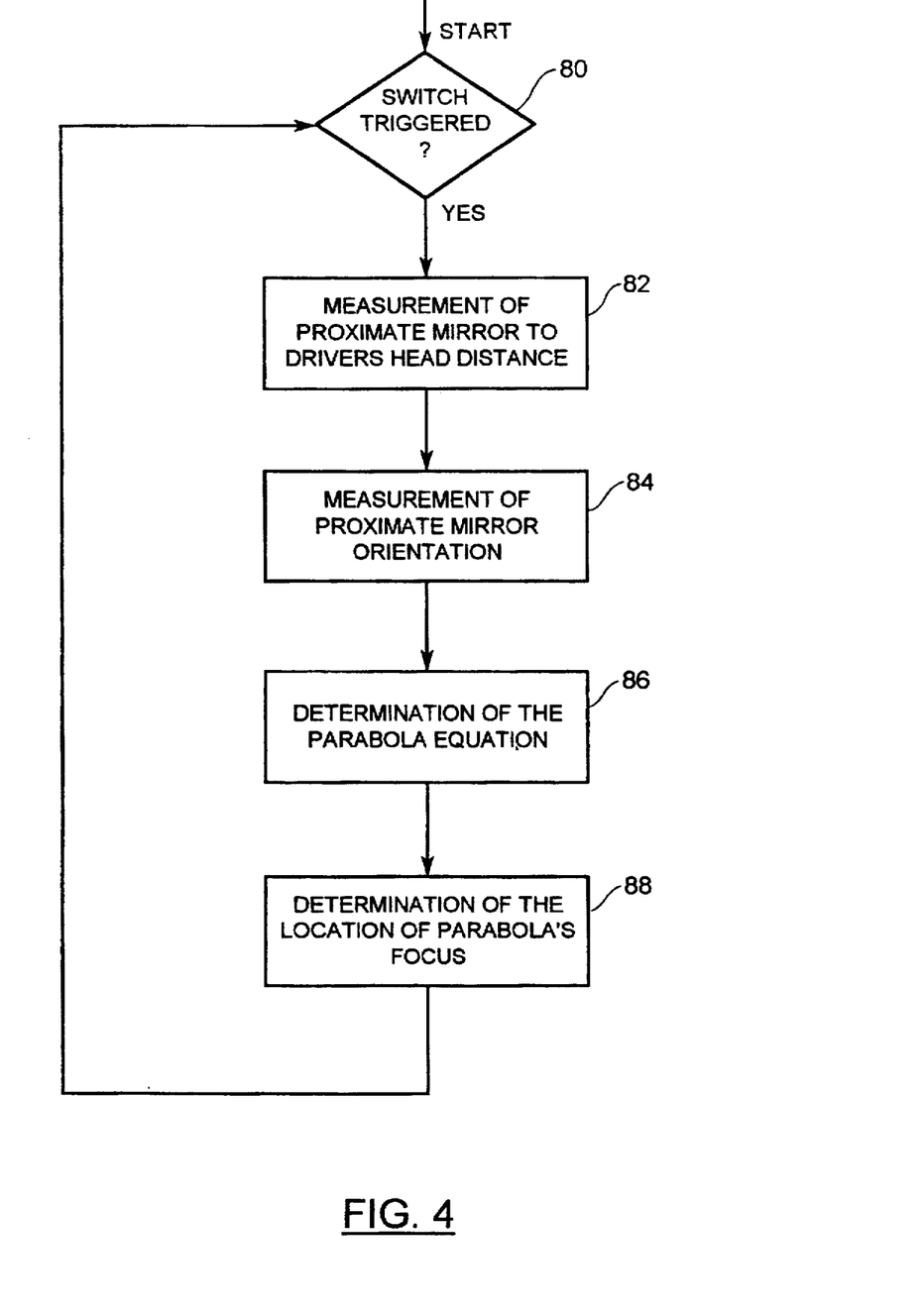
FIG. 4 is a flow chart of a program shown in FIG. 3.

Referring now to FIG. 4, microcomputer 62 is programmed with computer software stored in ROM memory 67, which operates as follows. When switch 46 is triggered (block 80), distance sensor 42 and orientation detector 44 make their measurements and send their output signals to microcomputer 62. Microcomputer 62 then determines the distance between central mirror 20 and driver's eyes 27 (block 82) and the orientation of the central mirror (block 84). Microcomputer 62 subsequently parametrizes the equation of a parabola in space to yield the equation of the parabola (a) inhabiting the plane orthogonal to mirror 20 in center point 30 and containing mirror center point 30 and unit vector 50, (b) of axis parallel to unit vector 50, (c) such that vector 50 is directed towards the concave side of the parabola, (d) containing mirror center point, and (e) of distance, focus to mirror center point, the length of vector 32 (block 86). Subsequently, from the parabola equation obtained, the location of the parabola's focus is computed, yielding the location of the driver's eyes center point 27 (block 88).

Microcomputer 62 determines the location of the driver's eyes by implementing the following algorithm. Given:
(1) the coordinates of center point 30 (central mirror),
(2) the distance from the point 30 (central mirror) to the driver's eyes 27 provided by distance sensor 42,
(3) the orientation of the central mirror provided by central mirror orientation detector 44,
(4) the unit direction vector for light ray 50, the coordinates of the driver's eye 27 are determined as follows:
  (a) the equation of a parabola in space is parametrized in order to obtain the equation of the parabola inhabiting the plane orthogonal to mirror 20 in center point 30 and containing mirror center point 30 and unit vector 50, of axis is parallel to unit vector 50, such that vector 50 is directed towards the concave side of the parabola, containing mirror center point, and of distance focus to mirror center point the length of vector 32;
  (b) having obtained the equation of the above mentioned parabola, the location of the parabola's focus is obtained using well known relationships relating the equation of a parabola and the location of its focus, thus yielding the coordinates of the driver's eyes center point 27; and
  (c) knowing that vector 32 is perpendicular to the driver's head surface in driver's eyes center point 27, the location of the rotation and tilt axes of driver's head 26 are uniquely determined, defining the space inhabited by the driver's eyes center point 27, when the driver moves his head.

For explanation purposes, other approaches being possible, an approach to obtaining the relationships required for implementing steps (a) and (b) of the above algorithm is presented:

Consider the general equation of a parabola in a plane defined by coordinates x and y (other than the coordinates X, Y and Z defined in FIG. 1):

$$(x+x_1)^2 = 4c(y+y_1)$$

where $x_1$, $y_1$, and c are constants, and c represents the distance of the focus to the parabola's vertex, and where (x, y) are the coordinates of a point on the parabola. The tangent to the parabola in a point (x, y) is given by $$dy/dx = (x+x_1)/(2c)$$

the focus coordinates are given by $(-x_1, c-y_1)$
Knowing that the mirror center point is located at the point $(x,y)=(0,0)$, we have from the equation above $(x+x_1)^2=4c(y+y_1)$ the following $$x_1^2 = 4cy_1. \quad (1)$$

Given the value a of the tangent $dy/dx=(x+x_1)/2c$ at that point (from the orientation detecting means), we have at $(x,y)=(0,0)$:

$$a=(x+x_1)/(2c)=x_1/2c. \quad (2)$$

Given the value b of the distance mirror center point to focus (from the distance sensing means), using the focus coordinates and triangulation we have, $$b^2=(x_1)^2+(c-y_1)^2. \quad (3)$$

So that, we have three equations and three unknowns and can solve for $x_1$, $y_1$ and c, thus obtaining the coordinates of the focus.

In use, the driver manually adjusts central mirror 20. Driver 12 then presses switch 46, which activates distance sensor 42, which measures the distance between the mirror 20 and the driver's eyes center point 27. Switch 46 also activates central mirror orientation detector 44 which measures the orientation of central mirror 20. The signals from sensor 42 and detector 44 are processed by microcomputer 62 to determine the coordinates of the driver's eyes center point 27.

Figure 5:
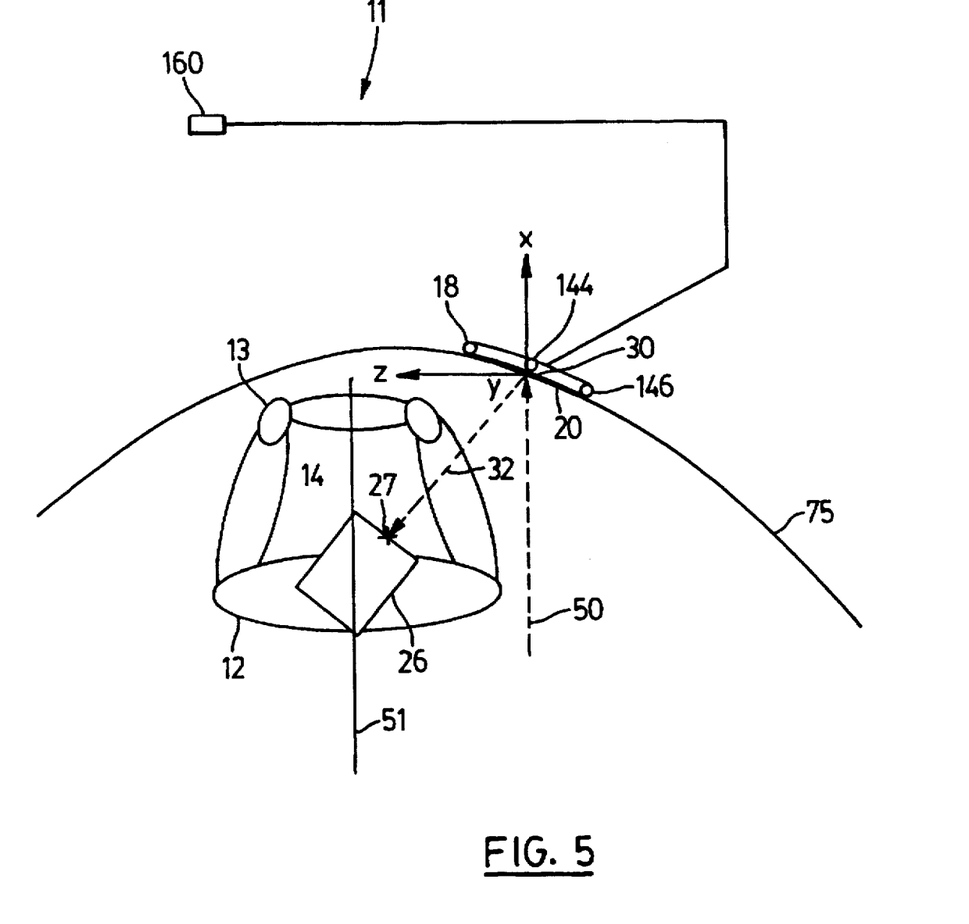
FIG. 5 is a schematic top plan view of an alternative embodiment of the invention.

Referring now to FIG. 5, in an alternative embodiment shown generally as 11, the subject apparatus comprises an orientation detector 144, signals processor 160, and activation switch 146. This alternative embodiment is based upon the assumption that the driver will tend to assume a driving position directly behind steering wheel 14, such that the driver's eyes center point falls within a vertical plane 51 extending longitudinally through the middle of the driver's seat when the driver's is looking straight ahead. Apparatus 11 accordingly does not require a distance sensor like sensor 46 of apparatus 10.

In use, the driver manually adjusts central mirror 20. Driver 12 then presses switch 146, which activates central mirror orientation detector 144 which measures the orientation of central mirror 20. The signals from orientation detector 144 are processed by signal processor 160 to determine the coordinates of the driver's eyes center point 27.

Signal processor 160 comprises a microcomputer generally similar to microcomputer 62 which, however, is programmed to determine the location of the driver's eyes by implementing the following algorithm. Given:

(1) the coordinates of center point 30 (central mirror);
(2) the location of vertical plane 51;
(3) the orientation of the central mirror provided by central mirror orientation detector 144; and
(4) the unit direction vector for light ray 50, the coordinates of the driver's eye 27 are determined as follows:
   (a) knowing that vector 32 inhabits the plane orthogonal to mirror 20 in center point 30 and containing mirror center point 30 and unit vector 50, and knowing that vector 32 is perpendicular to the driver's head surface in driver's eyes center point 27, and assuming that the rotation axis lies in the driver's seat longitudinal center plane 51, the equation of a parabola in space is parametrized to yield the equation of the parabola inhabiting the plane orthogonal to mirror 20 in center point 30 and containing mirror center point 30 and unit vector 50, of axis parallel to unit vector 50, of focus the driver's eyes center point 27, such that vector 50 is directed towards the concave side of the parabola, and containing mirror center point 27;
   (b) having obtained the equation of the above mentioned parabola, the location of the parabola's focus is obtained using well known relationships relating the equation of a parabola and the location of its focus, thus yielding the coordinates of the driver's eyes center point 27; and
   (c) knowing that vector 32 is perpendicular to the driver's head surface in driver's eyes center point 27, the location of the rotation and tilt axes of driver's head 26 are uniquely determined, defining the space inhabited by the driver's eyes center point 27, when the driver moves his head.

For explanation purposes, other approaches being possible, an approach to obtaining the relationships required for implementing steps (a) and (b) is presented as follows. Equation (3) is modified so as to consider the size of the head and the location of the vertical plane. Along the line joining the mirror center point to the focus, the distance from mirror center point to the focus (eyes) plus the distance of the focus (eyes) to the vertical plane, must equal the distance from mirror center point to the vertical plane. Given the depth of the head (from face surface to back), and therefore given the distance d of the focus (eyes) to the vertical plane, and given $x_v$ the lateral position of the plane, i.e. given the distance from mirror center point to the vertical plane, we have $$\text{distance\_plane\_to\_focus} + \text{distance\_focus\_to\_mirror\_center\_point} = \text{distance\_plane\_to\_mirror\_center\_point} \quad (3')$$

$$[d(-x_1)/[(x_1)^2+(c-y_1)^2]^{0.5}]+(-x_1)=x_v \quad (3'')$$

So that again, we have three equations and three unknowns and can solve for $x_1$, $y_1$, and c, thus obtaining the coordinates of the parabola's focus.

While the subject apparatus determines the location of the driver's eyes, if the computed location is outside a space volume in which the driver's eyes are expected to be, the apparatus will make the conflict known by some signal such as a light or a sound.

While the subject apparatus has been shown to be triggered by a switch, it could also be triggered by a change of orientation of the proximate mirror, caused by the driver adjusting the proximate mirror.

While the proximate mirror of the subject apparatus was described to be manually adjusted, it could also be adjusted indirectly by operating a mechanical joystick or a switch for a servomechanism.

While two embodiment of the apparatus have been described, a combination of these embodiments is also possible, especially in order to determine for error checking purposes, whether the location of the driver's eyes as determined by one embodiment matches the location of the driver's eyes as determined by the other embodiment.

While the subject apparatus determines the location of the driver's eyes center point, it could also determine the location of the driver's eyes when these are modelled as a single point within the driver's head, or when the driver's head is modelled as a single point.

While the subject apparatus has been described alone, it can be used in conjunction with various rearview mirror positioning systems which require as one of the inputs the location of the driver's eyes.

It should therefore be understood that various modifications can be made to the embodiments of the invention described and illustrated herein, without departing from the subject invention, the scope of which is defined in the appended claims.

I claim:

1. Apparatus for determining the location of the eyes of a driver of a vehicle having a directly adjustable proximate rearview mirror, comprising:
   (a) distance sensing means for sensing the distance between the proximate mirror and the driver's head and generating distance signals correlatable therewith;
   (b) orientation detecting means for detecting the orientation of the proximate mirror after adjustment by the driver to achieve a desired rearview sightline, and generating orientation signals correlatable therewith; and
   (c) signal processing means coupled to the distance sensing means and the orientation detecting means for processing the distance signals and the orientation signals and for generating output signals indicative of a current location for the driver's eyes based upon an equation for a parabola having a focus located at the driver's eyes.

2. The apparatus defined in claim 1, wherein the signal processing means comprises means for determining an equation for a parabola having a focus located at the driver's eyes and an axis parallel to a rearview vector representing the desired rearview sightline, and falling in a plane containing the rearview vector, the plane being perpendicular to the central mirror, and containing the center point of the mirror, and means for determining the location of the focus of the said parabola.

3. The apparatus defined in claim 1, wherein the signal processing means models the driver's head as a rectangular parallelepiped having a front side corresponding to the driver's face, and the driver's eyes are modelled as a point on the front side midway between the eyes on the driver's face.

4. The apparatus defined in claim 1, wherein the signal processing means comprises a microcomputer comprising storage means for storing vehicle parameters, the distance signals, and the orientation signals, determining means for determining the current location for the driver's eyes, and signal generating means for generating the output signals.

5. Apparatus as defined in claim 1, further comprising activation means operable by the driver for activating the distance sensing means and the orientation detecting means.

6. Apparatus defined in claim 1, wherein the proximate mirror comprises a central inside mirror.

7. The apparatus defined in claim 1, wherein the distance sensing means comprises an infrared sensor mounted adjacent the proximate mirror.

8. The apparatus defined in claim 1, wherein the distance sensing means comprises an ultrasound sensor mounted adjacent the proximate mirror.

9. The apparatus defined in claim 5, wherein the activation means comprises a manually operated switch.

10. The apparatus defined in claim 1, wherein the orientation detecting means comprises a position sensor coupled to the proximate mirror.

11. The apparatus defined in claim 1, wherein the signal processing means comprises:
   (a) storage means for storing a center point signal indicative of the known center point of the proximate mirror; and
   (b) processing means operatively coupled to the distance sensing means, the orientation detecting means and the storage means, for processing the center point signal, the distance signals, and the orientation signals, and for generating processed signals indicative of a current location of the eyes of the driver, based upon an equation for a parabola having a focus located at the driver's eyes.

12. A method for determining the location of the eyes of a driver of a vehicle having a directly adjustable proximate rearview mirror, comprising:
   (a) sensing the distance between the proximate mirror and the driver's head and generating distance signals correlatable therewith;
   (b) detecting the orientation of the proximate mirror after adjustment by the driver to achieve a desired rearview sightline, and generating orientation signals correlatable therewith; and
   (c) processing the distance signals and the orientation signals and generating output signals indicative of a current location for the driver's eyes based upon an equation for a parabola having a focus located at the driver's eyes.

13. Apparatus for determining the location of the eyes of a driver of a vehicle having a directly adjustable proximate mirror having a known center point, comprising:
   (a) storage means for storing a center point signal indicative of the known center point of the proximate mirror, and a longitudinal plane signal indicative of a longitudinal vertical plane extending through the middle of the driver's seat at a known lateral distance from the center point of the mirror;
   (b) orientation detecting means for detecting the orientation of the proximate mirror after adjustment by the driver to achieve a desired reflected sightline, and generating orientation signals correlatable therewith; and
   (c) processing means operatively coupled to the orientation detecting means and the storage means, for processing the center point signal, the longitudinal plane signal, and the orientation signals, and for generating a processed signal indicative of a current location of the eyes of the driver, based upon an equation for a parabola having a focus located at the driver's eyes.

14. The apparatus defined in claim 13, wherein the processing means comprises means for determining an equation for a parabola lying in a plane orthogonal to the central mirror and containing the center point of the mirror, having a focus located at the driver's eyes and an axis parallel to a rearview vector representing the desired rearview sightline.

15. The apparatus defined in claim 14, wherein the processing means models the driver's head as a rectangular parallelepiped having a front side corresponding to the driver's face, and the driver's eyes are modelled as a point on the front side midway between the eyes on the driver's face.

16. The apparatus defined in claim 15, wherein the processing means includes means for determining the distance between the proximate mirror and the driver's head based upon the known lateral distance and the rectangular parallelepiped.

17. A method for determining the location of the eyes of a driver of a vehicle having a directly adjustable proximate mirror having a known center point, comprising the steps of:

(a) storing a center point signal indicative of the known center point of the proximate mirror, and a longitudinal plane signal indicative of a longitudinal plane extending through the middle of the driver's seat at a known lateral distance from the center point of the mirror;

(b) detecting the orientation of the proximate mirror after adjustment by the driver to achieve a desired reflected sightline, and generating orientation signals correlatable therewith; and (c) processing the center point signal, the longitudinal plane signal, and the orientation signals, and generating a processed signal indicative of a current location of the eyes of the driver, based upon an equation for a parabola having a focus located at the driver's eyes.

* * * * *